(12) United States Patent
Reuter et al.

(10) Patent No.: US 7,281,131 B1
(45) Date of Patent: Oct. 9, 2007

(54) ASSURING PHYSICAL SECURITY OF A SUBSCRIBER LINE DEVICE

(75) Inventors: Michael Reuter, San Francisco, CA (US); Rohit Anand Fedane, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 738 days.

(21) Appl. No.: 10/762,145

(22) Filed: Jan. 20, 2004

(51) Int. Cl.
*G06F 9/00* (2006.01)
(52) U.S. Cl. ............... 713/164; 713/168; 713/182; 713/193
(58) Field of Classification Search ............ 713/164, 713/168, 182, 193
See application file for complete search history.

(56) References Cited

U.S. PATENT DOCUMENTS 6,861,946 B2    3/2005    Verplaetse et al.

OTHER PUBLICATIONS

*Information Sheet 6 —2001 Security and Personal Information*; From Website: http://www.privacy.gov.au/2001 pp. 1-4.
*Information Security, Security Controls Implementation, Physical Security*; From Website: http://www.ffiec.gov/ Home Page Last Updated Oct. 29, 2004 pp. 1-3.
*Physical Security Guide: Protection, Detection and Response*; From Website: http://www.rcmp-grc.gc.ca/index_e.htm Dec. 2004, pp. 1-20.
*Communicatel Products Page*; From Website: http://www.01com.com/ Zero One LLC Copyright 2003 pp. 1-2.
*Application of a Met ric for Physical Security in Campus Computer Labs*; Terrance A. Roebuck, University of Saskatchewan From Website: http://www.01com.com/ Copyright Jan. 1997, revised Oct. 1998, May 2000 pp. 1-6.
*4 Hidden Spy Cameras Product Page*; From Website: http://4hiddenspycameras.com/ 4 Hidden Spy Cameras pp. 1-3.

*Primary Examiner*—Thomas R. Peeso
(74) *Attorney, Agent, or Firm*—Marger Johnson & McCollom, P.C.

(57) ABSTRACT

A security system and method for a client device connected to a network by a broadband connection. The security system insures that the client machine has not been moved from its authorized location. A check is made to insure that the machine is located at its assigned location. If this check finds that the client machine is not at its assigned location, the network connection is inhibited or terminated.

20 Claims, 2 Drawing Sheets

ASSURING PHYSICAL SECURITY OF A SUBSCRIBER LINE DEVICE

FIELD OF THE INVENTION

The present invention relates to equipment that can remotely access a network and more particularly to the security of such equipment.

BACKGROUND OF THE INVENTION

Insuring that only authorized individuals or authorized equipment can connect to network or to a server is very important. If a client is connected to a server or a network by a POTS or ISDN line, caller ID, or a call-back mechanism can be used to insure that a call is coming from a particular location. Telephone caller ID allows one to insure that an incoming call is coming from a particular telephone line. A call back technique can also be used to insure that a device connected by a POTS or ISDN line is connected via a particular telephone line or location.

The packets transmitted by client devices which have a broadband connection do not specify the physical location at which the packets originated. Security for broadband connections is often accomplished by storing an encrypted "key" on a client machine. Security in such a system is enforced by checking to insure that a client requesting access has this key stored on the client. However, if a device with a stored key is stolen is stolen, this key is also stolen. A stolen client machine with a stored key, can be at a different location; however, when a server interrogates the client, it will fine the required key stored on the client.

The present invention is directed to insuring that a client device is in fact connected to the network from a known location. That is, the present invention insures that a client device is not seeking access to a network after it has been moved from a pre-established location.

SUMMARY OF THE INVENTION

The present invention is directed to adding a layer of security to a network client device that is connected to a network via a broadband connection. The security provided by the present invention takes into account the physical location of the client device. The security provided by the present invention insures that the client machine has not been moved from its authorized or pre-established location.

With the present invention, a check is made to insure that the machine connected by a broadband connection is located at its assigned location. If this check finds that the client machine is not at its assigned location, the broadband network connection is inhibited or terminated.

One embodiment of the invention takes advantage of the fact that most clients connected to a network via broadband, also have a POTS or ISDN connection to the outside world. With this embodiment of the invention, a client connected to a network with a high speed broadband connection, uses a caller ID mechanism or a callback mechanism on a slow speed POTS or ISDN connection to insure that the client is located at an assigned location.

In another embodiment of the invention, a GPS (global positioning system) mechanism is included in the client machine. When the client is connected to a network, a server can both check a encrypted key to insure that the client is an authorized client and the GPS data to insure that the client is at an assigned location.

DETAILED DESCRIPTION OF EMBODIMENTS

There are a variety of known broadband technologies that can be used to connect a client device to a network via a broadband connection. Two of the widely deployed technologies are "Cable" and "DSL". Security is an important consideration when a client connects to a network via a broadband connection. Frequently, security is implemented by storing an encrypted key on a client machine. When a client machine seeks to connect to a server, the server interrogates this key to insure that the client machine is authorized to access the server. Often a password (alone or a password together with an encrypted key) is also used to insure security.

However, a stored encrypted key or a password cannot be used to insure that a broadband connected client machine has not been moved from its assigned location. The present invention provides a layer of security that insures that a client machine is physically located at an assigned or pre-established location. The present invention can be used alone or in combination with other prior art security mechanisms.

The present invention can, for example, be used to verify that a client machine has not been stolen and moved to a new location. The present invention provides an alternative or additional mechanism for insuring network security for a client machine connected to a network with a broadband connection.

Figure 1:
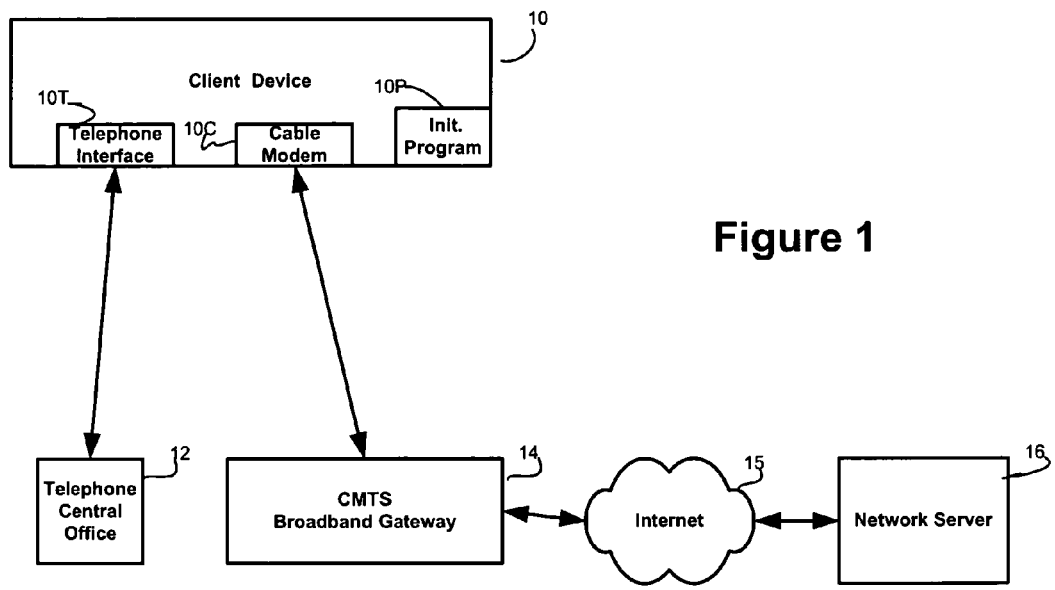
FIG. 1 is a system diagram of a first embodiment of the invention with a client machine connected to a network via a cable modem.

A first embodiment of the present invention is shown in FIG. 1. The system shown in FIG. 1 includes a client device 10 that is connected to a network server 16 via a broadband cable. The client 10 includes a cable modem 10C and an interface 10T to the normal telephone network 12. The client device 10 also includes an initialization program 10P. The client device 10 could for example be a personal computer or a network router. The telephone connection 10T could for example be a conventional modem or it could be some other type of conventional telephone network interface.

The cable modem 10 is connected to a CMTS (Cable Modem Termination System) which is part of the broadband gateway 14. The broadband gateway 14 is connected network server 16 through the Internet 15. Connecting devices to a network by cable systems is conventional and not further described herein.

Figure 2:
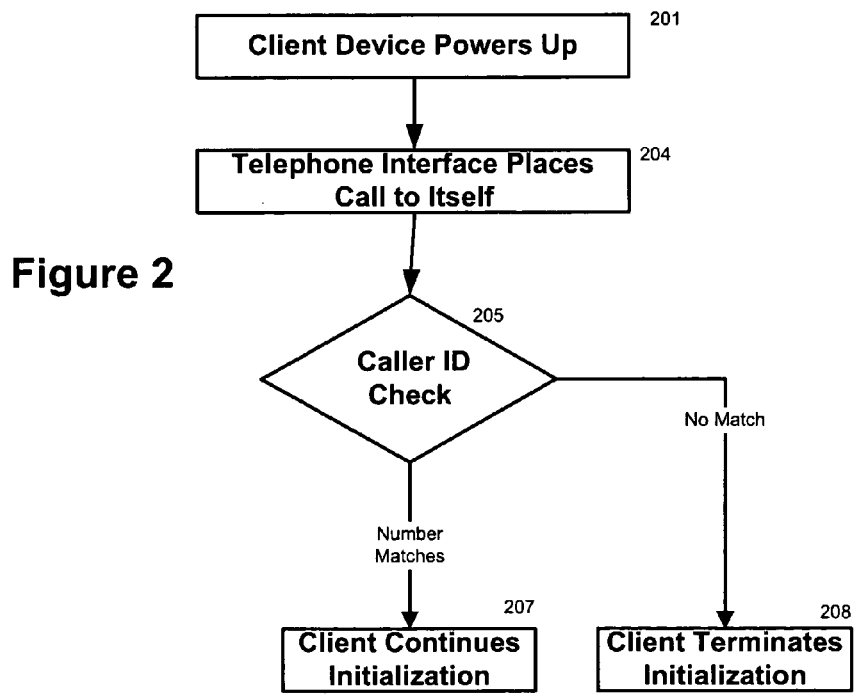
FIG. 2 is a flow diagram illustrating the operation of the first embodiment of the invention.

The system operates as shown in FIG. 2. When the client device 1 powers up, (that is when the client device 1 is initialized) the initialization program 10P causes the device 1 to place a call to itself via telephone network interface 10T. For example, if the telephone line from the central office 12 has the telephone number 345-1212, the telephone interface 10T places a call to 345-1212. The telephone line to central office 12 has the conventional call waiting and caller ID features.

As indicated by block 205, when the telephone interface 10T receives the incoming call, it checks the caller ID number in a conventional manner. If the number matches the pre-stored number (in this case 345-1212) the client 10 continues it normal initialization process. If the numbers do not match, this indicates that the client device 10 has been moved and connected via a different telephone line and the process terminates. The reason for this is that the caller ID number is associated with a particular physical telephone line, and not with the device connected to that physical line. The device which actually initiates a call on a particular line does not affect the caller ID number of that physical line. Telephone devices for placing calls and checking called ID numbers are conventional and thus telephone interface 10T is not further described herein.

It is noted that the stored telephone number (against which the called ID number is matched) can be stored in the program 10P in an encrypted manner so that it can not be changed other than by an authorized used. Various known security devices can be used to protect this number from an un-authorized change.

In alternate embodiments were Call Waiting and Caller ID features are not available, the telephone interface 1oT modem can call to a special number which connects to a call back device (not shown in the drawings) which initiates a call back process. In such an embodiment, initialization only proceeds if the device in fact receives the appropriate call back.

Naturally it should be understood that initialization program 10P also performs the other normal initialization operations.

The network server 16, can also authenticate the client using other conventional authentication processes. For example, a key stored on the client can be interrogated in a conventional manner to insure that the correct machine is trying to access the server.

In summary the first embodiment shown in FIG. 1 adds a security mechanism that insures that a client machine has not been moved from its assigned location. This additional security measure can be used alone or together with other known security measures.

Figure 3:
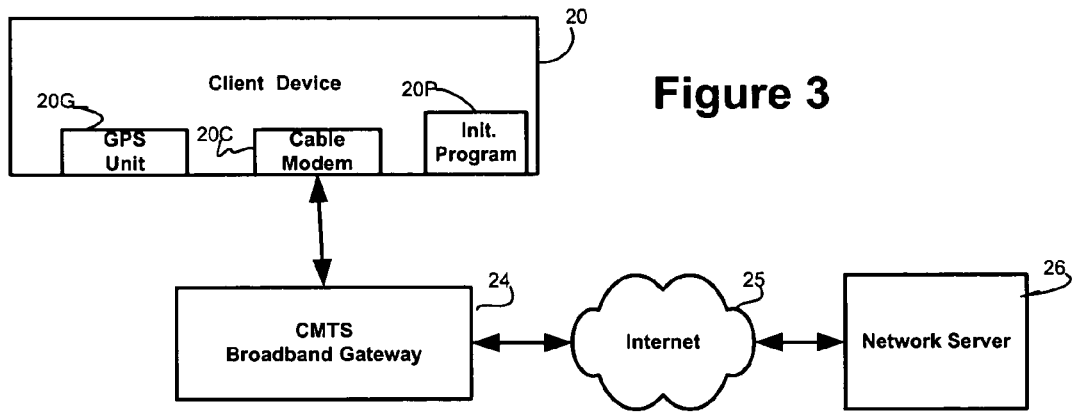
FIG. 3 is a block diagram of a second embodiment of the invention.

A second embodiment of the invention is shown in FIG. 3. In this second embodiment of the invention, the client device 20 includes a cable modem 20C and an initialization program 20P similar to the first embodiment of the invention. Also similar to the first embodiment, the client 20 is connected to the Internet 25 and from there to a server 26. However, in this second embodiment of the invention, the client device 20 includes a "Global Positioning System" (GPS) unit 20G. The GPS unit 20G is a conventional receiver, that determines its actual physical position from satellite signals. The unit 20G determines it global coordinates (longitude and latitude) and stores then in a register (not explicitly shown in the drawings). Such a GPS unit is conventional and not further described herein.

When the client unit 20 is initialized, the initiation program 20P reads the coordinates determined by unit 20G. These coordinates are compared to coordinates previously stored in the client. If the coordinates match, it indicates that the unit has not been moved, and the initialization proceeds. If the coordinates do not match, the initialization is terminated. It is noted that the coordinates can be stored in the program 20P in an encrypted manner so that they cannot be changed other than by an authorized used.

Figure 4:
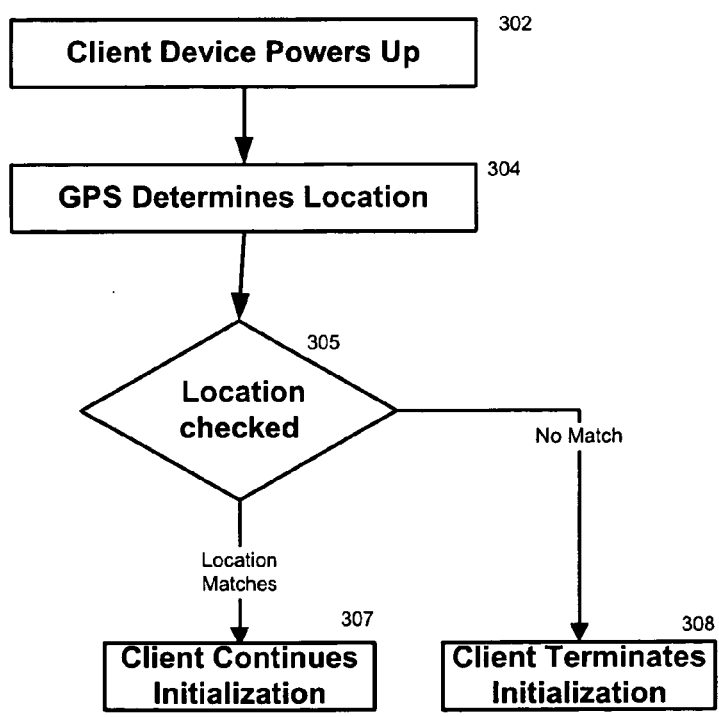
FIG. 4 is a flow diagram illustrating the operation of the second embodiment of the invention.

The operation of the system is illustrated in FIG. 4 which illustrates the relevant steps performed by initiation program 20P in conjunction with GPS unit 20G.

Naturally it should be understood that initialization program 20P also performs the other normal initialization operations.

The operations occur when the unit powers up as indicated by block 302. The GPS unit 20G determines its coordinates as indicated by block 304. As indicated by block 305, a check is made to determine if the coordinates determined by GPS unit 20G match those stored in initialization program 20P. If the numbers match the initialization proceeds in a normal manner as indicated by block 307. If the coordinates do not match the initialization process stops.

In still another alternate embodiment, when the numbers do not match, a signal is sent to a security server by cable via cable modem 20C and CMTS gateway 24. The signal sent to the security server can include the coordinates indicated by GPS unit 20U, thereby giving an indication of the location of a possibly stolen unit.

Various other embodiments of the invention are also possible. There are a variety of alternative techniques that can be used to connect a remote client to a server via the internet. Embodiments utilizing various broadband network technologies are possible.

For example another embodiment utilizes the Digital Subscriber Line (DSL) technology and protocol. DSL allows high speed data communication over copper telephone lines between end-users and central offices. DSL allows one pair of wires to be used for a regular telephone connection (using low frequencies) and a broadband digital connection (using higher frequencies). This type of connection is becoming popular in the United States and it is even more popular in Europe.

An embodiment using DSL could be similar to the embodiment shown in FIG. 1, except that instead of a cable modem and a CMTS gateway, such an embodiment would include a single pair of wires connecting the client machine to the gateway device. These wires would carry both a normal POTS connection and a broadband connection. The operation of such an embodiment would be similar to the first embodiment except that the broadband and the POTS connection would be via a single pair of wires.

It is noted that the various embodiments of the invention could be used singularly or in combination for added security. For example, in still another embodiment, both the embodiments shown in FIGS. 1 and 3 could be implemented in the same client. Such an embodiment would both call itself and check the caller ID and compare GPS coordinates before initializing.

Likewise the location checking mechanism described herein could be used alone or in combination with other security mechanisms such as the used of an encrypted stored key and password. Such an embodiment would both check a caller ID as does the first embodiment or check GPS coordinates as does the second embodiment and interrogate a stored encrypted key and/or a password. The number of security techniques used in any particular instance is a matter of engineering choice depending on the circumstances.

In the above described embodiments, the check of the physical location of the client device is performed at the time the device is initialized, in other embodiments, this check could be performed at various other time. For example, the physical location check could be performed each hour of operation or each day of operation, etc.

In the above described embodiments, the initialization process is terminated if the actual physical location of the device does not match some pre-established physical location. It is noted that instead of terminating the initiation process, various the client device could be prohibited from connecting to the network by various other means such as by disabling the cable modem or other broadband connection.

It is noted that herein the terms client machine and client device are used interchangeably to mean the same thing. Namely, as used herein both the terms "client device" and "client machine" refer to a client connected to a network by a broadband connection. The network 15 and 25 can be a Local Area Network (LAN) or a Wide Area Network (WAN). Networks 15 and 25 could for example be the Internet.

While various embodiments of the invention have been shown, it will be understood by those skilled in the art, that various other changes in form and detail may be made without departing from the spirit and scope of the invention. The scope of the invention is limited only by the appended claims.

We claim:

1. A security method for a client device connected to a network by a broadband connection, said method including,
   a security check sequence operable when said device is initialized,
   said security check sequence including,
   automatically determining the actual physical location of said client device,
   comparing said actual physical location to a pre-established physical location,
   termination said initialization of said client device if said physical location and said pre-established locations o not match, and
   continuing said initialization of said client device if said physical location and said pre-established locations do match,
   whereby said client device is only initialized if said device is at a pre-established physical location.

2. The method of claim 1 wherein the actual physical location of said client device is determined by initiating a telephone call to said client device from a telephone line connected to said client device and checking the caller ID of the telephone line that initiated said call.

3. The method of claim 1 wherein the actual physical location of said client device is determined by use of a Global Positioning System (GPS) unit.

4. The method of claim 1 wherein said client device is connected to a network by uses of a cable modem.

5. The method of claim 1 wherein said client device is connected to a network by uses of a Digital Subscriber Line (DSL) connection.

6. The method of claim 1 wherein said client device is connected to the Internet.

7. The method of claim 1 wherein said client device includes a stored encrypted key which can be checked by a server.

8. The method of claim 1 wherein a server is automatically notified if said actual physical location and said pre-established located do not match.

9. A security system for a network client device which is connected to a network by a broadband connection, said security system determining if said client device is operating from a pre-established physical location, said security system including,
   a mechanism for automatically determining the actual physical location of said client device,
   a comparison mechanism for comparing actual physical location of said client device to said pre-established physical location,
   a mechanism for terminating the operation of said device if said physical location and said pre-established location are different.

10. The system of claim 9 wherein the actual physical location of said client device is determined by initiating a telephone call to said client device from a telephone line connected to said client device and checking the caller ID of the telephone line that initiated said call.

11. The system of claim 9 wherein the actual physical location of said client device is determined by use of a Global Positioning System (GPS) unit.

12. The system of claim 9 wherein said client device is connected to a network by uses of a cable modem.

13. The system of claim 9 wherein said client device is connected to a network by uses of a Digital Subscriber Line (DSL) connection.

14. The system of claim 9 wherein said client device is connected to the Internet.

15. The system of claim 9 wherein said client device includes a stored encrypted key which can be checked by a server.

16. The system of claim 9 wherein a server is automatically notified if said actual physical location and said pre-established located do not match.

17. A security system for a network client device connected to a network by a broadband network connection, said security system determining if said client device is operating from a pre-established physical location, said security system including,
   means for automatically determining the actual physical location of said client device,
   means for comparing actual physical location of said client device to said pre-established physical location,
   means for terminating the operation of said device if said physical location and said pre-established location are different.

18. The system of claim 17 wherein the actual physical location of said client device is determined by a means for initiating a telephone call to said client device from a telephone line connected to said client machine and a means checking the caller ID of the telephone line that initiated said call.

19. The system of claim 17 wherein the actual physical location of said client device is determined by use of a Global Positioning System (GPS) means.

20. A security method for a client device which is connected to a network by a broadband network connection, said method including,
   automatically determining the actual physical location of said client device,
   comparing said actual physical location to a pre-established physical location, and
   inhibiting said client device from using said broadband network connection if said physical location and said pre-established locations do not match,
   whereby said client device can only be connected to said network by said broadband connection if said client device is operated from a pre-established physical location.

* * * * *